(12) United States Patent
Dopf et al.

(10) Patent No.: US 7,252,160 B2
(45) Date of Patent: Aug. 7, 2007

(54) ELECTROMAGNETIC GAP SUB ASSEMBLY

(75) Inventors: Tony Dopf, Calgary (CA); Derek William Logan, Calgary (CA); Paul Leonard Camwell, Calgary (CA); Michael Nero, Houston, TX (US); Clemens L. Horst, Houston, TX (US); Robert E. Smallwood, Calgary (CA)

(73) Assignee: Weatherford/Lamb, Inc., Houston, TX (US)

( * ) Notice: Subject to any disclaimer, the term of this patent is extended or adjusted under 35 U.S.C. 154(b) by 362 days.

(21) Appl. No.: 10/903,909

(22) Filed: Jul. 30, 2004

(65) Prior Publication Data

US 2005/0068703 A1 Mar. 31, 2005

Related U.S. Application Data

(60) Continuation-in-part of application No. 10/744,683, filed on Dec. 23, 2003, now Pat. No. 7,093,680, and a continuation of application No. 10/161,310, filed on Jun. 3, 2002, now Pat. No. 6,672,383, which is a division of application No. 09/777,090, filed on Feb. 5, 2001, now Pat. No. 6,405,795, which is a division of application No. 08/981,070, filed as application No. PCT/CA96/00407 on Jun. 11, 1996, now Pat. No. 6,209,632.

(60) Provisional application No. 60/491,569, filed on Jul. 31, 2003.

(30) Foreign Application Priority Data

Jun. 12, 1995 (CA) .................... 2151525

(51) Int. Cl.
*E21B 17/02* (2006.01)
*E21B 47/00* (2006.01)

(52) U.S. Cl. ............ 175/40; 166/65.1; 166/242.6; 175/320; 340/854.4

(58) Field of Classification Search ............... 175/40, 175/320; 166/242.1, 65.1, 242.6; 340/854.6, 340/854.4
See application file for complete search history.

(56) References Cited

U.S. PATENT DOCUMENTS 2,000,716 A 5/1935 Polk (Continued)

FOREIGN PATENT DOCUMENTS

CA 676449 12/1963

(Continued)

OTHER PUBLICATIONS

U.K. Search Report, Application No. GB04170726.6, dated Nov. 22, 2004.

(Continued)

*Primary Examiner*—Hoang Dang
(74) *Attorney, Agent, or Firm*—Patterson & Sheridan, L.L.P.

(57) ABSTRACT

A compact, robust, wear resistant, and high performance electrically insulating gap sub for use with borehole EM Telemetry is disclosed. In one embodiment, the gap sub may include an externally threaded mandrel separated from an internally threaded housing by a dielectric material. Additionally, some embodiments may include an external gap ring for separating the upper and lower electrical halves of the sub which offers structural support, acts as the primary external seal, and provides an abrasion resistant non-conductive length on the exterior. Some embodiments may include torsion pins to prevent the possible unscrewing of the dielectric filled threaded sections should the dielectric material become damaged or weakened.

26 Claims, 4 Drawing Sheets

U.S. PATENT DOCUMENTS

| | | | |
|---|---|---|---|
| 2,096,279 A | 10/1937 | Karcher | |
| 2,151,525 A | 3/1939 | Pittman et al. | |
| 2,364,957 A | 12/1944 | Douglas | |
| 2,388,141 A | 10/1945 | Harrington | |
| 2,650,067 A | 8/1953 | Martin | |
| 2,917,704 A | 12/1959 | Arps | |
| 2,940,787 A | 6/1960 | Goodner | |
| 3,831,138 A | 8/1974 | Rammner | |
| 3,900,827 A | 8/1975 | Lamel et al. | |
| 3,905,010 A | 9/1975 | Fitzpatrick | |
| 4,015,234 A | 3/1977 | Krebs | |
| 4,160,970 A | 7/1979 | Nicolson | |
| 4,348,672 A | 9/1982 | Givler | |
| 4,494,072 A | 1/1985 | Jeter et al. | |
| 4,496,174 A | 1/1985 | McDonald et al. | |
| 4,578,675 A | 3/1986 | MacLeod | |
| 4,589,187 A | 5/1986 | Stone et al. | |
| 4,625,173 A | 11/1986 | Wisler et al. | |
| 4,674,773 A | 6/1987 | Stone et al. | |
| 4,691,203 A | 9/1987 | Rubin et al. | |
| 4,736,204 A | 4/1988 | Davison | |
| 4,786,086 A | 11/1988 | Guthrie et al. | |
| 4,790,570 A | 12/1988 | De Gruijter | |
| 4,800,385 A | 1/1989 | Yamazaki | |
| 4,861,074 A | 8/1989 | Eastlund et al. | |
| 4,927,186 A | 5/1990 | Zoboli | |
| 4,980,682 A | 12/1990 | Klein et al. | |
| 5,130,706 A | 7/1992 | Van Steenwyk | |
| 5,138,313 A | 8/1992 | Barrington | |
| 5,163,714 A | 11/1992 | Issenmann | |
| 5,184,692 A | 2/1993 | Moriarty | |
| 5,251,708 A | 10/1993 | Perry et al. | |
| 5,278,550 A | 1/1994 | Rhein-Knudsen et al. | |
| 5,303,773 A | 4/1994 | Czernichow et al. | |
| 5,394,141 A | 2/1995 | Soulier | |
| 5,396,232 A | 3/1995 | Mathieu et al. | |
| 5,448,227 A | 9/1995 | Orban et al. | |
| 5,725,061 A | 3/1998 | Van Steenwyk et al. | |
| 5,749,605 A | 5/1998 | Hampton, III et al. | |
| 5,924,499 A | 7/1999 | Birchak et al. | |
| 6,050,353 A | 4/2000 | Logan et al. | |
| 6,098,727 A | 8/2000 | Ringgenberg et al. | |
| 6,158,532 A | 12/2000 | Logan et al. | |
| 6,209,632 B1 | 4/2001 | Holbert et al. | |
| 6,223,826 B1 | 5/2001 | Chau et al. | |
| 6,367,323 B1 | 4/2002 | Camwell et al. | |
| 6,405,795 B2 | 6/2002 | Holbert et al. | |
| 6,439,324 B1 | 8/2002 | Ringgenberg et al. | |
| 6,572,152 B2 | 6/2003 | Dopf et al. | |
| 6,657,597 B2 * | 12/2003 | Rodney et al. | 343/719 |
| 6,672,383 B2 | 1/2004 | Holbert et al. | |
| 6,801,136 B1 | 10/2004 | Goodman et al. | |
| 6,926,098 B2 * | 8/2005 | Peter | 175/40 |
| 2002/0113432 A1 * | 8/2002 | Dopf et al. | 285/48 |
| 2002/0189803 A1 | 12/2002 | Holbert et al. | |
| 2004/0069574 A1 | 4/2004 | Rodney et al. | |
| 2004/0134652 A1 | 7/2004 | Holbert | |

FOREIGN PATENT DOCUMENTS

| | | |
|---|---|---|
| CA | 1217231 | 1/1987 |
| CA | 1277027 | 11/1990 |
| CA | 1323691 | 10/1993 |
| CA | 2151525 | 6/1995 |
| FR | 2174955 | 10/1973 |
| FR | 2618912 | 2/1989 |
| FR | 2618912 | 3/1989 |
| GB | 1359445 | 7/1974 |
| WO | WO 82/02754 | 8/1982 |
| WO | WO 96/41931 | 12/1996 |
| WO | WO 98/06924 | 2/1998 |
| WO | WO 00/13349 | 3/2000 |

OTHER PUBLICATIONS

CA Office Action, Application No. 2,476,370, Dated Aug. 28, 2006.

* cited by examiner

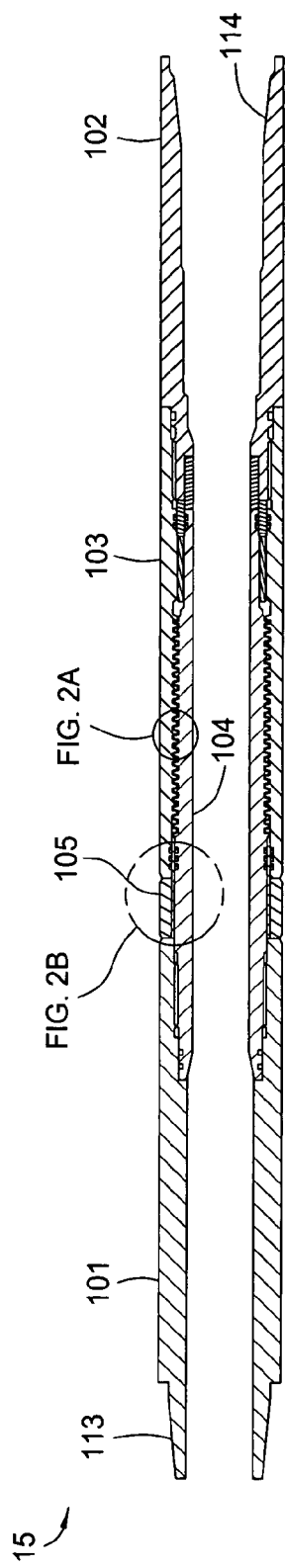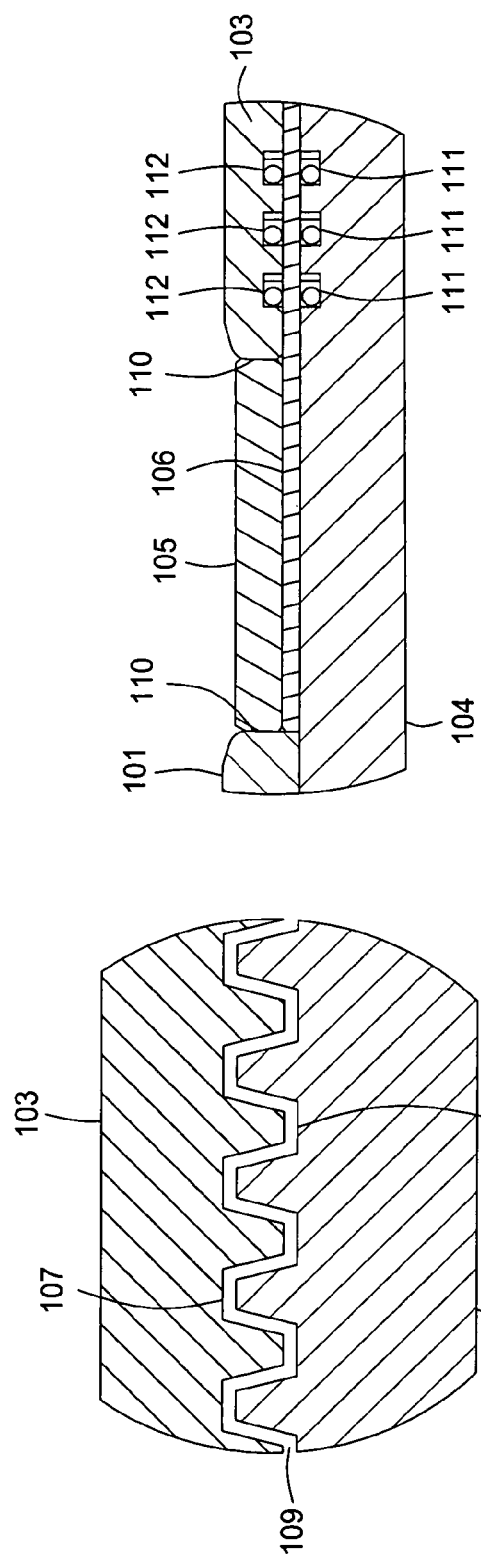
FIG. 2
FIG. 2A
FIG. 2B

ELECTROMAGNETIC GAP SUB ASSEMBLY

CROSS-REFERENCE TO RELATED APPLICATIONS

This application claims priority to U.S. Provisional Patent Application Ser. No. 60/491,569, filed Jul. 31, 2003.

This application is a continuation-in-part of U.S. patent application Ser. No. 10/744,683, filed Dec. 23, 2003. U.S. patent application Ser. No. 10/744,683 has issued as U.S. Pat. No 7,093,680. U.S. patent application Ser. No. 10/744,683 is a continuation of U.S. patent application Ser. No. 10/161,310, filed Jun. 3, 2002. U.S. patent application Ser. No. 10/161,310 has issued as U.S. Pat. No. 6,672,383. U.S. patent application Ser. No. 10/161,310 is a divisional of U.S. patent application Ser. No. 09/777,090, filed on Feb. 5, 2001. U.S. patent application Ser. No. 09/777,090 has issued as U.S. Pat. No. 6,405,795. U.S. patent application Ser. No. 09/777,090 is a divisional of U.S. patent application Ser. No. 08/981,070, filed Dec. 10, 1997. U.S. patent application Ser. No. 08/981,070 has issued as U.S. Pat. No. 6,209,632. U.S. patent application Ser. No. 08/981,070 is the National Stage of International Application No. PCT/CA96/00407, filed Jun. 11, 1996. International Application No. PCT/CA96/00407claims benefit of Canadian Patent Application Serial No. 2,151,525, filed on Jun. 12, 1995.

BACKGROUND OF THE INVENTION

1. Field of the Invention

This invention generally relates to borehole telemetry. More particularly, the invention relates to an electrically insulating gap sub assembly used for electromagnetic telemetry between surface and subsurface locations or between multiple subsurface locations.

2. Description of the Related Art

During a typical drilling operation, a wellbore is formed by rotating a drill bit attached at an end of a drill string. To provide for a more efficient drilling operation, various techniques may be employed to evaluate subsurface formations, such as telemetry, as the wellbore is formed. Generally, telemetry is a system for converting the measurements recorded by a wireline or measurements-while-drilling (MWD) tool into a suitable form for transmission to the surface. In the case of wireline logging, the measurements are converted into electronic pulses or analog signals that are sent up the cable. In the case of MWD, they are usually converted into an amplitude or frequency-modulated pattern of mud pulses. Some MWD tools use wirelines run inside the drill pipe. Others use wireless telemetry in which signals are sent as electromagnetic waves through the Earth. Wireless telemetry is also used downhole to send signals from one part of a MWD tool to another. The most commonly used drilling telemetry methods can be arranged into several distinct groups such as wireline, mud pulse, or electromagnetic (EM).

In the first telemetry group, wireline communication involves one or more insulated cables that has a wide bandwidth and thus can communicate large amounts of data quickly, but the cable must be pulled out of the hole when adding additional sections of drill pipe. This is time consuming and reduces overall drilling efficiency. It also may not be possible to rotate the drill string with the wireline cable in the hole.

In the second telemetry group, mud pulse telemetry, the drilling fluid is utilized as the transmission medium. As the drilling fluid is circulated in the wellbore, the flow of the drilling fluid is repeatedly interrupted to generate a varying pressure wave in the drilling fluid as a function of the downhole measured data. A drawback of the mud pulse technique is that the data transmission rates are very slow. Transmission rates are limited by poor pulse resolution as pressure pulses attenuate along the borehole and by the velocity of sound within the drilling mud. Further, while mud pulse systems work well with incompressible drilling fluids such as a water-based or an oil-based mud, mud pulse systems do not work well with gasified fluids or gases typically used in underbalanced drilling.

In the third telemetry group, electromagnetic (EM) telemetry, relatively low frequency (4-12 Hz) electromagnetic waves are transmitted through the earth to the surface where the signal is amplified, filtered, and decoded. Communication may also be accomplished in the reverse direction.

In a typical EM operation, generating and receiving the electromagnetic waves downhole involves creating an electrical break between an upper section and a lower section of a drill string to form a large antenna. Thereafter, sections of this antenna are energized with opposite electrical polarity often using a modulated carrier wave that contains digital information. The resulting EM wave travels through the earth to the surface where a potential difference may be measured between a rig structure and a point on the surface of the earth at a predetermined distance away from the rig.

Typically, the electrical break in the drill string is accomplished by a device referred to as a gap sub assembly. Generally, the gap sub assembly must electrically insulate the upper and lower sections of the drill string and yet be structurally capable of carrying high torsional, tensile, compressive, and bending loads. The known gap sub assembly includes an external non-conductive section with composite coatings to isolate the upper and lower sections. However, these coatings generally lack sufficient abrasion resistance when in contact with the abrasive rock cuttings and require frequent maintenance or replacement. In addition, the composite coatings typically do not provide a significant beneficial effect to the bending or compressive strength of the design. Additionally, the known gap sub assembly is expensive to manufacture. Furthermore, the known gap sub assembly is bulky and cumbersome to employ during a drilling operation.

Therefore, a need exists for a gap sub assembly that is capable of withstanding the abrasive environment of a wellbore. Further, there is a need for a gap sub assembly that is capable of withstanding the bending and compressive loading that occurs during a drilling operation. Furthermore, there is a need for a gap sub assembly that is cost effective to manufacture. Further yet, a need exists for a gap sub assembly that is compact and may be easily employed during a drilling operation.

SUMMARY OF THE INVENTION

This invention overcomes the problem of creating an electrical break in the drill string in a compact and cost effective yet highly robust method.

In one embodiment, an apparatus for use with an EM telemetry system is provided, comprising: a housing; a mandrel; a dielectric material disposed between the housing and the mandrel; and a first non-conductive gap ring disposed between the housing and the mandrel.

Optionally, the mandrel is bonded to the housing with the dielectric material. The housing and the mandrel may be configured to remain axially coupled in the event of failure of the dielectric material. The housing and the mandrel section may be attached by a threaded connection so that the housing and the mandrel remain axially coupled in the event of failure of the dielectric material. The dielectric material may be disposed in the threaded connection. The apparatus may further comprise an anti-rotation member configured so that the housing and the mandrel remain rotationally coupled in the event of failure of the dielectric material. The anti-rotation member may comprise at least one non-conductive torque pin disposed between the housing and the mandrel. The first gap ring may be fabricated from a toughened ceramic material. The first gap ring may provide structural support in bending and compression. The first gap ring is may be preloaded in compression between the housing and the mandrel to provide a seal between the housing and the mandrel. The dielectric material may be epoxy.

Further, the mandrel may comprise a first section and a second section coupled by a threaded connection. The housing may comprise a first section and a second section coupled by a threaded connection. The first gap ring may be disposed between the second section of the housing and the second section of the mandrel. The apparatus may further comprise a second non-conductive gap ring disposed between the first section of the housing and the first section of the mandrel. The apparatus may further comprise a first seal assembly disposed between the second section of the housing and the first section of the mandrel. The first seal assembly may comprise a first sleeve made from a relatively high strength, high temperature plastic; and at least one elastomer sealing element disposed between the first sleeve and the second section of the housing and at least one elastomer sealing element disposed between the first sleeve and the first section of the mandrel. The apparatus may further comprise a second seal assembly similar to that of the first seal assembly. The apparatus may further comprise: a first compression ring disposed between the first gap ring and the mandrel and a second compression ring disposed between the first gap ring and the housing. The compression rings may be made from a relatively soft, strain-hardenable material.

In another embodiment, an apparatus for use with an EM telemetry system is provided, comprising: a housing; a mandrel; a dielectric material bonding the mandrel to the housing, wherein the apparatus is configured so that the housing and the mandrel remain coupled in the event of failure of the dielectric material.

In another embodiment, an apparatus for use with an EM telemetry system, comprising: a housing; a mandrel; means for electrically isolating the housing from the mandrel and for primarily coupling the housing to the mandrel; and means for secondarily coupling the housing to the mandrel in the event of failure of the primary coupling means.

In another embodiment, a method of receiving data from a wellbore, comprising: placing a gap sub assembly between an upper portion and a lower portion of a drill string, the gap sub assembly comprising: a housing; a mandrel; a dielectric material disposed between the housing and the mandrel; and a first non-conductive ring disposed between the housing and the mandrel; positioning the drill string and the gap sub assembly in the wellbore; energizing the upper portion and the lower portion of the drill string with opposite electrical polarity, thereby forming the electromagnetic wave; and measuring the electromagnetic wave at a predetermined point on the surface of the wellbore.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 illustrates a cross-sectional view of the gap sub assembly.

FIG. 2A illustrates an expanded view of dielectric filed threads in the gap sub assembly.

FIG. 2B illustrates an expanded view of an external gap ring disposed in the gap sub assembly.

DETAILED DESCRIPTION OF THE PREFERRED EMBODIMENT

Embodiments of the present invention generally provide a method and an apparatus for use in an EM telemetry system. For ease of explanation, the invention will be described generally in relation to drilling directional wells, but it should be understood, however, that the method and the apparatus are equally applicable in other telemetry applications. Furthermore, it should be noted that the principles of the present invention are applicable not only during drilling, but throughout the life of a wellbore such as logging, testing, completing, and producing the well.

Figure 1:
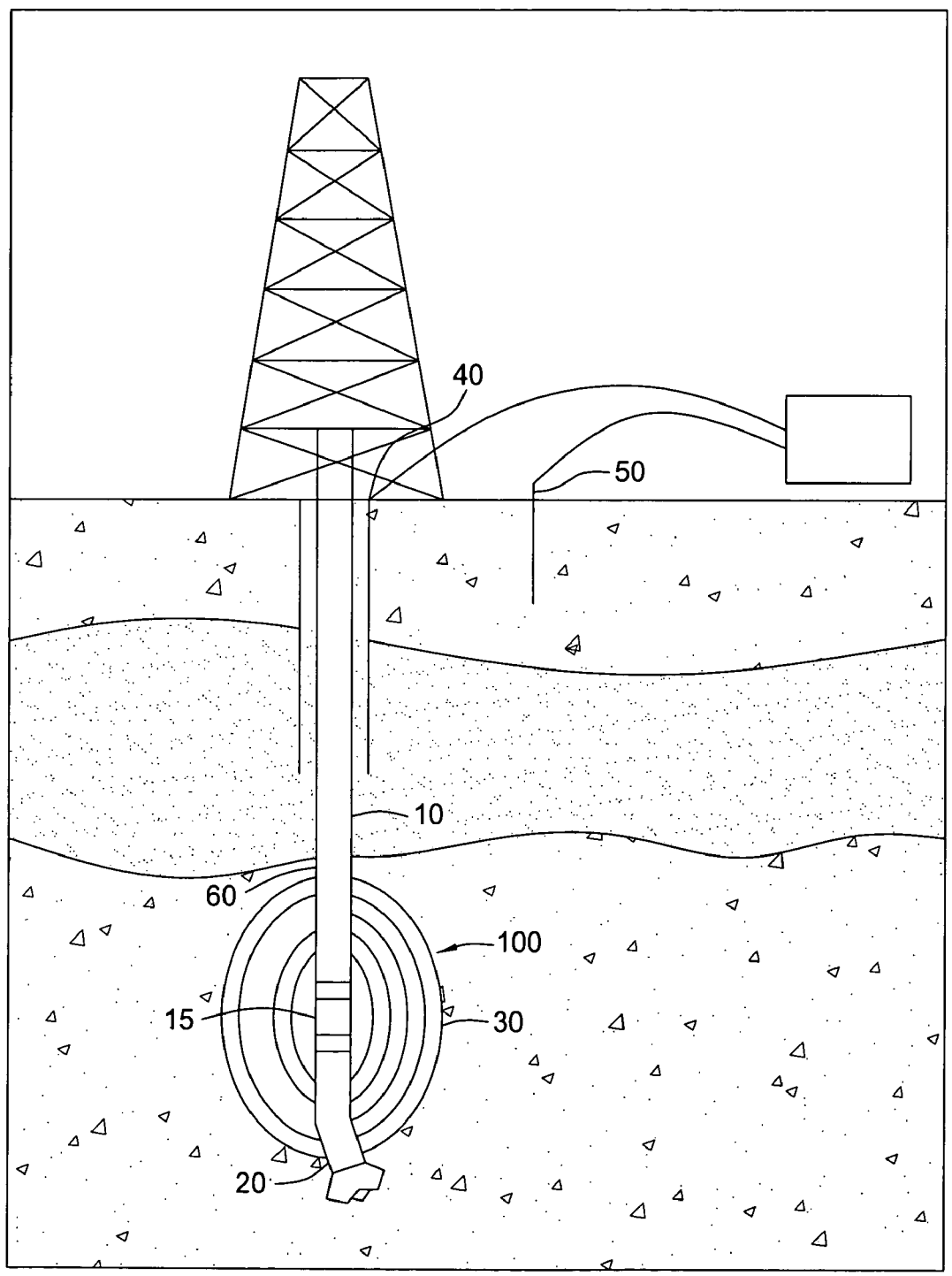
FIG. 1 illustrates a drilling rig structure and an EM telemetry system utilizing a gap sub assembly of the present invention.

FIG. 1 illustrates a drilling rig structure 40 and an EM telemetry system 100 utilizing a gap sub assembly 15 of the present invention. Generally, the EM telemetry system 100 may be used as a method to generate and receive the electromagnetic waves downhole. The method typically involves creating an electrical break between an upper section 10 and a lower section 20 of a drill string 60 to form a large antenna. The sections 10, 20 of this antenna are energized with opposite electrical polarity, often using a modulated carrier wave that contains digital information which results in an EM wave 30. Thereafter, the EM wave 30 travels through the earth to the surface where a potential difference may be measured between the rig structure 40 and a point 50 on the surface of the earth at a predetermined distance away from the rig.

In the embodiment illustrated, the electrical break in the drill string 60 is accomplished by a device referred to as the gap sub assembly 15. Generally, the gap sub assembly 15 is an electrical isolation joint disposed between the upper and lower sections 10, 20 of the drill string 60. Preferably, the gap sub assembly 15 is constructed and arranged to carry high torsional, tensile, compressive, and bending loads.

It has been determined that the transmission efficiency of EM telemetry system 100 can be improved by increasing the non-conductive length of the gap on the exterior and interior in the range of 2-3" or more, compared with a very small gap, in the range of 1/32". The improvement is especially pronounced when the gap sub assembly 15 is immersed in conductive drilling fluids, as is often the case. The reason for this is that as the gap length is increased, the electrical resistance of the fluid path between the sections 10, 20 increases, and more of the current flows through the formation and thus to the surface instead of through the fluid where it does not provide any transmission benefit.

FIG. 2 illustrates a cross-sectional view of the gap sub assembly 15. As shown, the gap sub assembly 15 consists of a lower threaded member 101 which mates with a lower portion of the drill string (not shown) and an upper threaded member 102 which mates with an upper portion of the drill string. Alternatively, the gap sub assembly may be disposed in the drill string upside down. Disposed between the upper and lower threaded members 101, 102 is a mandrel 104, a housing 103, and a first gap ring 105.

The upper threaded member 102 and lower threaded member 101 serve as thread savers for the housing 103 and mandrel 104. For instance under normal operating conditions, the upper threaded member 102 and lower threaded member 101 remain torqued up to the housing 103 and mandrel 104 respectively. Thereafter, exposed threads 113 and 114 are then used to attach the drill string above and below the gap sub assembly 15. The sequence of mating and unmating of these threads is done frequently and causes wear which may require re-cutting the threads. Eventually when the upper threaded member 102 and the lower threaded member 101 become too short to further re-cut, they may easily be replaced without requiring the entire gap sub assembly 15 to be replaced. Alternatively, the housing 103 and the upper threaded member 102 may be formed as one-piece and the mandrel 104 and the lower threaded member 101 may also be formed as one-piece.

FIG. 2A illustrates an expanded view of dielectric filed threads 107 in the gap sub assembly 15. As shown, the mandrel 104 contains an external threadform that has a larger than normal space 108 between adjacent threads. In the same manner, the housing 103 has an internal threadform with widely spaced threads 107. The mandrel 104 and housing 103 are separated from each other by a dielectric material 109, such as epoxy, which is capable of carrying axial and bending loads through the compression between adjacent threads. Typically, the load carrying ability of most dielectric materials is much higher in compression than tension and/or shear. In this respect, the total surface area bonded with the dielectric material 109 may also be increased dramatically over a purely cylindrical interface of the same length. Therefore, the increased surface area equates to higher strength in all loading scenarios.

Additionally, if the dielectric material 109 adhesive bonds fail and/or the dielectric material 109 can no longer carry adequate compressive loads due to excessive temperature or fluid invasion, the metal on metal engagement of the threads 107 prevents the gap sub assembly 15 from physically separating. Therefore, the mandrel 104 will remain axially coupled to the housing 103 and may be successfully retrieved from the wellbore.

FIG. 2B illustrates an expanded view of the first gap ring 105 disposed in the gap sub assembly 15. In the preferred embodiment, the first gap ring 105 is constructed from a toughened ceramic material, such as yttria stabilized tetragonal zirconia polycrystals, as it is a highly abrasion resistant, as well as an impact resistant material. Zirconia also has an elastic modulus and thermal expansion coefficient comparable to that of steel and an extremely high compressive strength (i.e. 290 ksi) in excess of the surrounding metal components. These properties allow the first gap ring 105 to support the joint under bending and compressive loading producing a significantly stronger and robust gap sub assembly 15. One advantage of a first gap ring 105 over that of a coated annular disc is that coatings may become scratched revealing the conductive underlying material. Another advantage of the first gap ring 105 is that a non-porous surface is easily achieved, whereas suitable high temperature coatings, such as flame deposited ceramic are highly porous preventing their use generally as a reliable sealing surface.

In the preferred embodiment, a primary external seal 110 is formed by torquing the lower threaded member 101 onto the mandrel 104 to compress the first gap ring 105 between the two halves of the gap sub assembly 15, thereby forming the primary external seal 110 on the faces of the first gap ring 105. The combination of high compressive stress, good surface finish, and low porosity in the first gap ring 105 produces a high pressure, high temperature seal that is compatible with the entire range of drilling fluids. In addition to the stress required between faces to seal under no-load conditions, a higher compressive stress is required to maintain face to face contact during bending and/or tension.

In an alternative embodiment, the primary external seal 110 may be formed by mechanically stretching the mandrel 104 by the use of a hydraulic cylinder (not shown) or other device. Thereafter, as the mandrel 104 is maintained in the stretched condition, the lower threaded member 101 can be threadingly advanced until it is in contact with the external gap ring 105, even though no significant torque has been applied. Upon releasing the stretch on the mandrel 104, the high compressive forces on the faces of the first gap ring 105 forms the primary external seal 110. In another alternative embodiment, the primary external seal 110 may be formed by cryogenically cooling the first gap ring 105 and subsequently mating the lower threaded member 101 thereto. As the first gap ring 105 warms up, it will expand creating the desired compressive forces to form the primary external seal 110.

The use of the first gap ring 105 in the gap sub assembly 15 of the present invention may provide several advantages. A first advantage is that it forms a structural element supporting the gap sub assembly 15 in bending and compression. A second advantage is that it provides a significant non-conductive external length which is virtually impervious to abrasion. A third advantage is that the first gap ring 105 is the primary external seal compatible with the full chemical and temperature range of drilling fluids.

As further shown on FIG. 2B, a secondary seal arrangement is disposed adjacent the external gap ring 105. The secondary seal arrangement includes a first sleeve 106 made from a high strength, high temperature plastic, such as PEEK and a series of elastomer seals 112, 111 disposed on the interior of the housing 103 and the exterior of the mandrel 104, respectfully. Preferably, the seals 112, 111 prevent fluid from entering the space between the mandrel 104 and the housing 103 if the primary seal 110 should fail. Furthermore, the first sleeve 106 supports the first gap ring 105 and provides some shock absorption should the first gap ring 105 experience a severe lateral impact. In another aspect, the ability to remove the lower threaded member 101 easily allows the seals 112, 111 and the first sleeve 106 to be inspected and replaced during a regular maintenance program.

Figure 3:
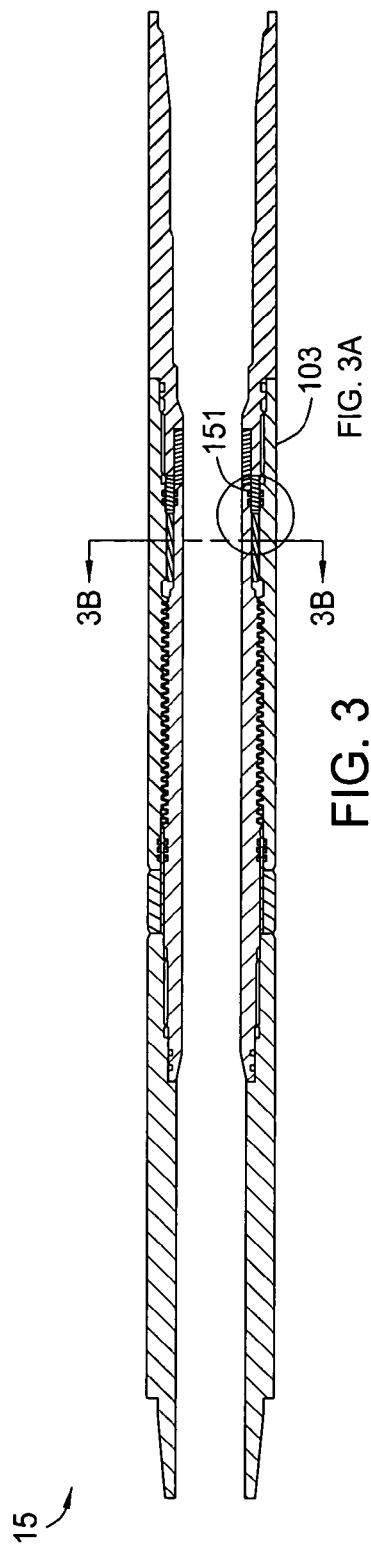
FIG. 3 illustrates a cross-sectional view of the gap sub assembly.

FIG. 3 illustrates a cross-sectional view of the gap sub assembly 15. FIG. 3A illustrates an expanded view of an internal, non-conductive seal arrangement 160 in the gap sub assembly 15. Preferably, the internal, non-conductive seal arrangement 160 includes a second sleeve 151 formed from a high temperature, high strength dielectric material, such as PEEK, and a series of elastomer seals 155, 156 disposed on the mandrel 104 and housing 103 respectively. Preferably, the elastomer seals 155, 156 prevent drilling fluid from entering the internal space between mandrel 104 and housing 103.

As further shown in FIG. 3A, a second, non-conductive gap ring 157 is provided in the bore of the gap sub assembly 15 to improve the electrical performance of the system. More specifically, as with the first gap ring 105, the second, non-conductive gap ring 157 increases the path length that the current must flow through, thereby increasing the resistance of that path, and thus decreasing the unwanted current flow in the interior of the gap sub assembly 15. In this manner, more of the current flows through the formation and thus to surface, instead of through the fluid where it does not provide any transmission benefit. Preferably, the second gap ring 157 is formed from a high temperature, high strength dielectric material, such as PEEK.

Figure 3B:
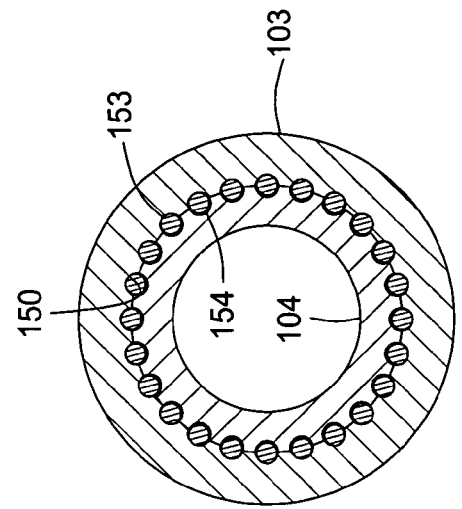
FIG. 3B illustrates an expanded view of a plurality of torsion pins in the gap sub assembly.
Figure 3A:
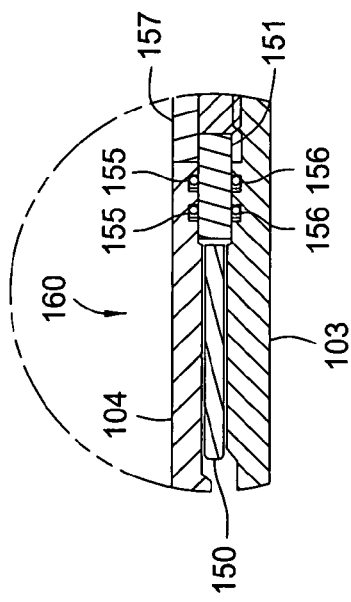
FIG. 3A illustrates an expanded view of a non-conductive seal arrangement in the gap sub assembly.

FIG. 3B illustrates an expanded view of the plurality of non conductive torsion pins 150 in the gap sub assembly 15. The torsion pins 150 are constructed and arranged to ensure that no relative rotation between the mandrel 104 and housing 103 may occur, even if the dielectric material 109 bond fails. In the preferred embodiment, the torsion pins 150 are cylindrical pins disposed in matching machined grooves 154 and 153. It is to be understood, however, that other forms of non-conductive devices may be employed such as non-conductive material forming keys in surrounding keyways, splines separated by a plastic insert, hexagonal sections separated by a non-conductive material, or a variety of other means known in the art to prevent rotation.

Figure 4:
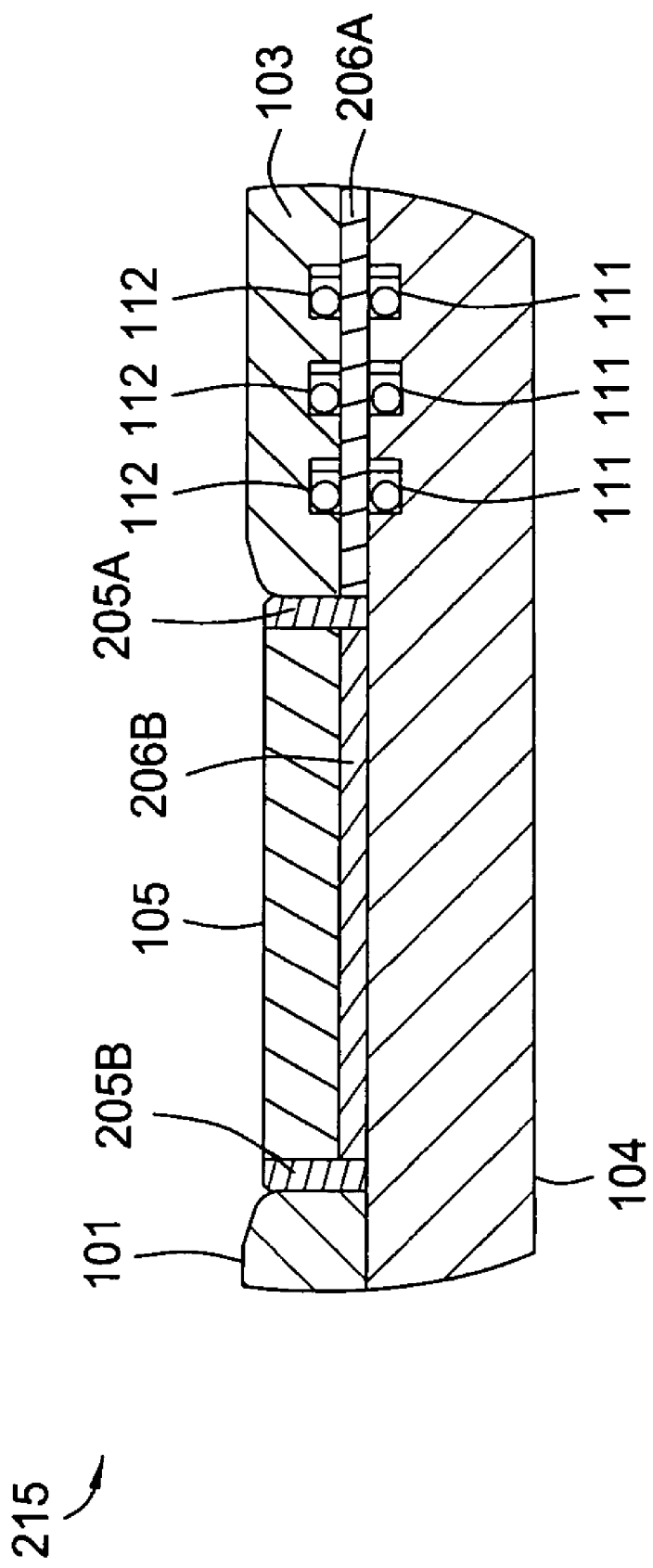
FIG. 4 illustrates an expanded view of an alternative embodiment of the gap sub assembly.

FIG. 4 illustrates an expanded view of an alternative embodiment 215 of the gap sub assembly 15. Only a portion of the alternative gap sub assembly 215 is shown because the rest of the alternative gap sub assembly is identical to the gap sub assembly 15. Parts that have not been substantially modified in this embodiment have retained the same reference numerals as that of gap sub assembly 15. In this embodiment, a first compression ring 205A is disposed between the housing 103 and the first gap ring 105. Since the first compression ring 205A radially extends to the mandrel 104, the first sleeve 106 has been split into two pieces 206A,B. A second compression ring 205B is disposed between the first gap ring 105 and the lower threaded member 101. Preferably, the compression rings 205A,B are made from a relatively soft strain hardenable material, such as an aluminum and bronze alloy.

During testing of an embodiment of the gap sub assembly 15, it was observed that when the preload was removed from the first gap ring 105 cracking resulted in the first gap ring 105. Since the cracks did not form until the preload was removed, operation of the first gap ring 105 is unaffected. However, the cracks would necessitate replacement of the gap ring 105 possibly every time the gap sub assembly 15 is dismantled. This is undesirable from a cost perspective since the preferred zirconia material is relatively expensive. It is believed that the cracking stems from surface imperfections in ends of the housing 103 and the lower threaded member 101 facing respective ends of the first gap ring 105. The relatively rough surface finish causes point loading between the first gap ring 105 and the housing 103 and lower threaded member 101.

To mitigate the point loading effect, each end of the housing 103 and the member 101 facing the first gap ring 105 would have to be machined to a relatively fine surface finish. Machining the required surface finish would be time consuming and expensive. However, addition of the compression rings 205A,B also mitigates the point loading effect. The preferred relatively soft material of the rings 205A,B conforms to the surface imperfections in the first gap ring 105 as the connection is torqued, thereby distributing the load over the entire respective surfaces of the first gap ring. The compression rings 205A,B will also preferably strain harden during torquing of the connection, thereby obtaining effects of increased strength and hardness which are beneficial to the service life of the compression rings. Therefore, compression rings 205A,B provide a simple and inexpensive fix to the cracking problem. Further, it is believed that the compression rings 205A,B may also minimize any torsional stress sustained by the first gap ring 105.

While the foregoing is directed to embodiments of the present invention, other and further embodiments of the invention may be devised without departing from the basic scope thereof, and the scope thereof is determined by the claims that follow.

The invention claimed is:

1. An apparatus for use with an EM telemetry system, comprising:
    a housing;
    a mandrel;
    a dielectric material bonding the mandrel to the housing;
    a threaded connection formed between the housing and the mandrel so that the housing and the mandrel remain axially coupled in the event of failure of the dielectric material, wherein the dielectric material is disposed in the threaded connection:
    an anti-rotation member or connection disposed or formed between the housing and the mandrel so that the housing and the mandrel remain rotationally coupled in the event of failure of the dielectric material; and
    a first non-conductive gap ring disposed between the housing and the mandrel.

2. The apparatus of claim 1, wherein the anti-rotation member or connection comprises at least one non-conductive torque pin disposed between the housing and the mandrel.

3. The apparatus of claim 1, wherein the first gap ring is fabricated from a toughened ceramic material.

4. The apparatus of claim 1, wherein the first gap ring provides structural support in bending and compression.

5. The apparatus of claim 1, wherein the first gap ring is preloaded in compression between the housing and the mandrel to provide a seal between the housing and the mandrel.

6. The apparatus of claim 1, wherein the dielectric material is epoxy.

7. The apparatus of claim 1, further comprising a seal assembly disposed between the housing and the mandrel.

8. The apparatus of claim 7, wherein the seal assembly comprises a sleeve made from a relatively high strength, high temperature plastic.

9. The apparatus of claim 8, wherein the seal assembly further comprises at least one elastomer sealing element disposed between the sleeve and the housing and at least one elastomer sealing element disposed between the sleeve and the mandrel.

10. The apparatus of claim 1, wherein the mandrel comprises a first section and a second section, the housing comprises a first section and a second section, and the first gap ring is disposed between the second section of the housing and the second section of the mandrel.

11. The apparatus of claim 10, further comprising a second non-conductive gap ring disposed between the first section of the housing and the first section of the mandrel.

12. The apparatus of claim 10, further comprising:
    a first seal assembly disposed between the second section of the housing and the first section of the mandrel, wherein the first seal assembly comprises:

a first sleeve made from a relatively high strength, high temperature plastic; and
at least one elastomer sealing element disposed between the first sleeve and the second section of the housing and at least one elastomer sealing element disposed between the first sleeve and the first section of the mandrel; and
a second seal assembly disposed between the second section of the housing and the first section of the mandrel, wherein the second seal assembly comprises:
a second sleeve made from a relatively high strength, high temperature plastic; and
at least one elastomer sealing element disposed between the second sleeve and the second section of the housing and at least one elastomer sealing element disposed between the second sleeve and the first section of the mandrel.

13. The apparatus of claim 1, further comprising: a first compression ring disposed between the first gap ring and the mandrel and a second compression ring disposed between the first gap ring and the housing.

14. The apparatus of claim 13, wherein the compression rings are made from a relatively soft, strain-hardenable material.

15. A method of receiving data from a wellbore, comprising:
placing the apparatus of claim 1 between an upper portion and a lower portion of a drill string;
positioning the drill string and the apparatus in the wellbore;
energizing the upper portion and the lower portion of the drill string with opposite electrical polarity, thereby forming an electromagnetic wave; and
measuring the electromagnetic wave at a predetermined point at a surface of the wellbore.

16. The method of claim 15, further comprising recording the electromagnetic wave.

17. The apparatus of claim 1, wherein the first gap ring is axially disposed between the housing and the mandrel.

18. The apparatus of claim 17, wherein the first gap ring forms a portion of an outer surface of the apparatus.

19. The apparatus of claim 18, further comprising a first sleeve made from a relatively high strength, high temperature plastic radially disposed between the housing and the mandrel and axially extending a length of the first gap ring and to the threaded connection.

20. The apparatus of claim 19, further comprising a second non-conductive gap ring disposed between the housing and the mandrel and forming a portion of an inner surface of the apparatus.

21. The apparatus of claim 20, further comprising a second sleeve made from a relatively high strength, high temperature plastic radially disposed between the housing and the mandrel and axially extending from an end of the second gap ring to the anti-rotation member or connection.

22. The apparatus of claim 21, further comprising at least one elastomer sealing element disposed between the first sleeve and the housing, at least one elastomer sealing element disposed between the first sleeve and the mandrel, at least one elastomer sealing element disposed between the second sleeve and the housing, and at least one elastomer seating element disposed between the second sleeve and the mandrel.

23. An apparatus for use with an EM telemetry system, comprising:
a housing;
a mandrel;
a dielectric material disposed between the housing and the mandrel;
a first non-conductive gap ring disposed between the housing and the mandrel;
a seal assembly disposed between the housing and the mandrel, wherein the seal assembly comprises:
a sleeve made from a relatively high strength, high temperature plastic; and
at least one elastomer sealing element disposed between the sleeve and the housing and at least one elastomer sealing element disposed between the sleeve and the mandrel.

24. An apparatus for use with an EM telemetry system, comprising:
a housing comprising a first section and a second section coupled by a threaded connection;
a mandrel comprising a first section and a second section coupled by a threaded connection;
a dielectric material disposed between the housing and the mandrel; and
a first non-conductive gap ring disposed between the second section of the housing and the second section of the mandrel; and
a first seal assembly disposed between the second section of the housing and the first section of the mandrel, wherein the first seal assembly comprises:
a first sleeve made from a relatively high strength, high temperature plastic; and
at least one elastomer sealing element disposed between the first sleeve and the second section of the housing and at least one elastomer sealing element disposed between the first sleeve and the first section of the mandrel: and
a second seal assembly disposed between the second section of the housing and the first section of the mandrel, wherein the second seal assembly comprises:
a second sleeve made from a relatively high strength, high temperature plastic; and
at least one elastomer sealing element disposed between the second sleeve and the second section of the housing and at least one elastomer sealing element disposed between the second sleeve and the first section of the mandrel.

25. An apparatus for use with an EM telemetry system, comprising:
a housing;
a mandrel;
a dielectric material disposed between the housing and the mandrel;
a first non-conductive gap ring disposed between the housing and the mandrel;
a first compression ring disposed between the first gap ring and the mandrel; and
a second compression ring disposed between the first gap ring and the housing.

26. The apparatus of claim 25, wherein the compression rings are made from a relatively soft, strain-hardenable material.

* * * * *